(12) United States Patent
Nagai et al.

(10) Patent No.: US 9,566,750 B2
(45) Date of Patent: Feb. 14, 2017

(54) COMPOUND LENS AND METHOD FOR MANUFACTURING SAME

(71) Applicant: FUJIFILM Corporation, Minato-ku, Tokyo (JP)

(72) Inventors: Takayasu Nagai, Ashigarakami-gun (JP); Naoyuki Morooka, Ashigarakami-gun (JP); Tatsuhiko Obayashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 249 days.

(21) Appl. No.: 14/498,240

(22) Filed: Sep. 26, 2014

(65) Prior Publication Data

US 2015/0015973 A1   Jan. 15, 2015

Related U.S. Application Data

(63) Continuation of application No. PCT/JP2013/057388, filed on Mar. 15, 2013.

(30) Foreign Application Priority Data

Mar. 29, 2012 (JP) ................................. 2012-078045

(51) Int. Cl.
| | |
|---|---|
| G02B 9/04 | (2006.01) |
| B29D 11/00 | (2006.01) |
| B29C 39/10 | (2006.01) |
| G02B 1/04 | (2006.01) |
| B29C 43/00 | (2006.01) |
| F21V 9/00 | (2015.01) |
| G02B 5/02 | (2006.01) |
| G02C 7/10 | (2006.01) |
| G02F 1/361 | (2006.01) |
| G03B 11/00 | (2006.01) |
| B29L 11/00 | (2006.01) |
| B29K 27/00 | (2006.01) |
| B29K 33/00 | (2006.01) |

(52) U.S. Cl.
CPC ......... B29D 11/00403 (2013.01); B29C 39/10 (2013.01); B29C 43/003 (2013.01); G02B 1/041 (2013.01); G02B 1/043 (2013.01); B29K 2027/00 (2013.01); B29K 2033/08 (2013.01); B29L 2011/0016 (2013.01)

(58) Field of Classification Search
USPC .......... 156/242; 252/582; 262/1.36, 1.7, 2.5; 359/796; 522/33; 526/280, 281
See application file for complete search history.

(56) References Cited

U.S. PATENT DOCUMENTS

| 8,822,563 B2 | 9/2014 | Mochizuki et al. |
| 2012/0019938 A1 | 1/2012 | Yamada |
| 2013/0131212 A1 | 5/2013 | Mochizuki et al. |

FOREIGN PATENT DOCUMENTS

| CN | 1335862 A | 2/2002 |
| CN | 101762835 A | 6/2010 |
| CN | 102361891 A | 2/2012 |
| JP | 2010-224119 A | 10/2010 |
| WO | 00/19246 A2 | 4/2000 |
| WO | 2012/014641 A1 | 2/2012 |

OTHER PUBLICATIONS

International Preliminary Report on Patentability dated Oct. 9, 2014, issued by the International Bureau in corresponding International Application No. PCT/JP2013/057388.
Office Action dated May 26, 2015, issued by the Japanese Patent Office in counterpart Japanese Application No. 2012-078045.
Office Action dated Nov. 12, 2015, from the State Intellectual Property Office of the People's Republic of China in counterpart Chinese Application No. 201380018160.2.

*Primary Examiner* — Bijan Ahvazi
(74) *Attorney, Agent, or Firm* — Sughrue Mion, PLLC

(57) ABSTRACT

A compound lens produced by heating and pressing a semi-cured product of a curable resin composition containing a (meth)acrylate monomer, a non-conjugated vinylidene group-containing compound, and a photo-radical initiator and a transparent substrate arranged so as to be in contact with the semi-cured product in a state in which a molding die is filled with the semi-cured product and the transparent substrate, and obtaining a cured product by allowing the semi-cured product to be thermally polymerized, exhibits an excellent transfer property, a small number of bubble mixtures, and excellent heat resistance and crack resistance.

18 Claims, No Drawings

COMPOUND LENS AND METHOD FOR MANUFACTURING SAME

CROSS-REFERENCE TO RELATED APPLICATIONS

This application is a continuation application of International Application No. PCT/JP2013/057388, filed Mar. 15, 2013, which in turn claims the benefit of priority from Japanese Application No. 2012-078045, filed Mar. 29, 2012, the disclosures of which Applications are incorporated by reference herein in their entirety.

BACKGROUND OF THE INVENTION

Field of the Invention

The present invention relates to a compound lens and a method of manufacturing the same.

Background Art

In the related art, inorganic glass materials have been used for optical components (also referred to as an optical element, mainly lenses) from a viewpoint of excellent optical characteristics, mechanical strength, and the like. In recent years, physical properties which cannot be obtained by the materials in the related art and reduction in manufacturing cost have been examined by means of using a compound lens obtained by combining inorganic glass materials with a resin composition.

Patent Literature 1 discloses a method of manufacturing a compound lens of glass, which is free from an adhesive, and plastic using an epoxy resin through thermal curing and discloses that the evaluation results on a ball drop test, an outside air resistance test, a temperature cycle test, and a hot water resistance test are excellent.

Patent Literature 2 discloses a three-layer (plastic, an adhesive, and glass) laminated lens without interlayer peeling after repetition cycles and discloses that interlayer peeling does not occur for a 30 day test at 50° C. at a humidity of 98% and a 30 day test with a temperature cycle having a range of −40° C. to 80° C.

Patent Literature 3 discloses a resin composition for a hybrid lens in which a resin composition used for forming a resin layer of a hybrid lens obtained by bonding a glass lens base material with the resin layer contains a radical polymerizable monomer and a silane coupling agent, and discloses that a hybrid lens which has a thick resin layer, high thickness deviation, and high performance capable of increasing aspherical amount can be manufactured.

On the other hand, a method of forming a molded article having a specific shape is known using a curable resin in a field other than the above-described compound lens.

Patent Literature 4 discloses a method of forming a cured product by curing a semi-cured product after the semi-cured product having a viscosity in a specific range is prepared using an epoxy ring-opening polymer (A) of a monofunctional epoxy compound, which includes a polymerizable unsaturated bonding group in the side chain thereof and a curable resin composition which includes a compound having a polymerizable unsaturated bonding group and has an alicyclic structure in the compound having the polymer (A) and/or a polymerizable unsaturated bonding group, but there is no description on application to the compound lens.

Further, a method of changing characteristics after curing by adding various additives to a curable resin composition has been known. For example, Example 1 of Patent Literature 5 related to the field other than the compound lens, as a COP protection coat material and a resin composition for coating of an alicyclic structure-containing polymer (COP)-based optical disk substrate discloses an aspect of using a curable resin composition to which monofunctional acryl, difunctional acryl, and a terpene compound are added with a content ratio of 0.5% by mass to 30% by mass with respect to acryls, and a terpene compound (limonene) and photopolymerization initiator are added and discloses that adhesion with a COP substrate can be improved.

CITATION LIST

Patent Literatures

Patent Literature 1: JP-A-6-27423
Patent Literature 2: JP-A-1-50013
Patent Literature 3: JP-A-2005-60696
Patent Literature 4: JP-A-2012-31331
Patent Literature 5: JP-A-2002-12684

SUMMARY OF INVENTION

However, when the compound lens using an epoxy resin disclosed in Patent Literature 1 is prepared by the present inventors, there is a problem in that bubbles are necessarily mixed at the time of preparation. Further, the compound lens using an epoxy resin has degraded shape stability and colorability with respect to heat and has a problem that needs to be solved in regard to heat resistance.

In addition, when the compound lens disclosed in Patent Literature 2 is prepared, there is a problem in that the glass transition temperature (hereinafter, also referred to as Tg) of an adhesive is low and the shape stability is degraded although peeling does not occur.

Further, when a compound lens is prepared by the present inventors after curing in a state of being in contact with a glass lens using the curable resin composition free from a non-conjugated vinylidene group-containing compound disclosed in Patent Literature 3, there are problems in that bubbles are mixed at the time of preparation and the shape stability is degraded with respect to heat and heat resistance is also poor.

Similarly, when a compound lens is prepared after curing in a state of being in contact with a glass lens using the curable resin composition disclosed in Patent Literature 4, which is free from a non-conjugated vinylidene group-containing compound, there are problems in that colorability is degraded with respect to heat and heat resistance is also poor. In addition, since a change in volume of the curable resin composition disclosed in Patent Literature 4 due to water absorption is large and cracks are generated when a heat and humidity test is performed on compound glass, it is difficult to consider diversion to a compound lens by being combined with those of Patent Literatures 1 to 3.

Further, since the curable resin composition disclosed in Patent Literature 5 has a high curing contraction ratio and wrinkles are generated on the surface of a resin when a compound lens is manufactured, it is difficult to consider diversion to a compound lens by being combined with those of Patent Literatures 1 to 3.

An object of the present invention is to solve the above-described problems. That is, a problem to be solved by the present invention is to provide a method of manufacturing a compound lens with an excellent transfer property, a small number of bubble mixtures, and excellent heat resistance and crack resistance.

As a result of intensive research done by the present inventors, they found that when a semi-cured product using a non-conjugated vinylidene group-containing compound and a (meth)acrylate monomer capable of improving heat resistance at the same time is used and the semi-cured product is arranged so as to be in contact with a transparent substrate and then cured, a transfer property, heat resistance, and crack resistance can be achieved, and mixture of bubbles can be reduced in a process of bringing a resin composition into contact with the transparent substrate at the time of preparing a compound lens, and the yield can be increased by suppressing a large number of bubble mixtures of the compound lens.

That is, the present inventors found that the above-described problems can be solved by the following structures, thereby completing the present invention.

[1] A method of manufacturing a compound lens, including a thermal polymerization process of heating and pressing a semi-cured product of a curable resin composition containing a (meth)acrylate monomer, a non-conjugated vinylidene group-containing compound, and a photo-radical initiator and a transparent substrate arranged so as to be in contact with the semi-cured product in a state in which a molding die is filled with the semi-cured product and the transparent substrate, and obtaining a cured product by allowing the semi-cured product to be thermally polymerized (here, a non-conjugated vinylidene group-containing compound is free from a (meth)acrylate monomer).

[2] It is preferable that the non-conjugated vinylidene group-containing compound be a compound represented by the following general formula (1) in the method of manufacturing a compound lens according to [1]:

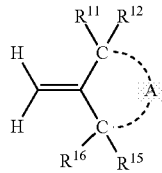

General Formula (1)

wherein $R^{11}$, $R^{12}$, $R^{15}$, and $R^{16}$ each independently represent a substituent and A represents an atomic group necessary for forming a cyclic structure.

[3] It is preferable that the transparent substrate be a glass material in the method of manufacturing a compound lens according to [1] or [2].

[4] It is preferable that the transparent substrate be a glass lens in the method of manufacturing a compound lens according to [1] or [2].

[5] It is preferable that the semi-cured product of the curable resin composition be a semi-cured product having a complex viscosity of $10^5$ mPa·s to $10^8$ mPa·s at a frequency of 10 Hz at 25° C. in the method of manufacturing a compound lens according to any one of [1] to [4].

[6] It is preferable that the method of manufacturing a compound lens according to any one of [1] to [5] further include a process of filling the molding die with the curable resin composition in a state of being in contact with the transparent substrate.

[7] It is preferable that the process of filling the molding die with the curable resin composition in a state of being in contact with the transparent substrate be a process of filling the molding die with the curable resin composition and laminating the transparent substrate on a surface of the curable resin composition on a side which is not in contact with the molding die in the method of manufacturing a compound lens according to [6].

[8] It is preferable that the molding die be filled with the semi-cured product of the curable resin composition and the transparent substrate be laminated on the surface of the semi-cured product of the curable resin composition on the side which is not in contact with the molding die in the method of manufacturing a compound lens according to any one of [1] to [5].

[9] It is preferable that the method of manufacturing a compound lens according to any one of [1] to [8] further include a process of performing at least one of photo-irradiation and heating with respect to the curable resin composition and forming a semi-cured product of the curable resin composition.

[10] It is preferable that the method of manufacturing a compound lens according to any one of [1] to [8] further include a process of performing photo-irradiation with respect to the curable resin composition and forming a semi-cured product of the curable resin composition.

[11] It is preferable that the curable resin composition contain a thermal radical initiator in the method of manufacturing a compound lens according to any one of [1] to [10].

[12] It is preferable that the curable resin composition contain 5% by mass to 50% by mass of a polymer having at least one polymerizable group selected from a methacryl group, an allyl group, an acryl group, and a vinyl group in a side chain thereof in the method of manufacturing a compound lens according to any one of [1] to [11].

[13] It is preferable that a weight average molecular weight of the polymer having at least one polymerizable group selected from a methacryl group, an allyl group, an acryl group, and a vinyl group at the side chain thereof be 2000 to 200000 in the method of manufacturing a compound lens according to [12].

[14] It is preferable that a liquid viscosity of the curable resin composition before semi-curing be 1000 mPa·s to 20000 mPa·s in the method of manufacturing a compound lens according to any one of [1] to [13].

[15] It is preferable that the molding die be a metal molding die in the method of manufacturing a compound lens according to any one of [1] to [14].

[16] A compound lens, in which a cured product of a curable resin composition containing 5% by mass to 50% by mass of a polymer which has a (meth)acrylate monomer, a non-conjugated vinylidene group containing compound, and a photo-radical initiator and has at least one polymerizable group selected from a methacryl group, an allyl group, an acryl group, and a vinyl group in a side chain thereof is laminated on at least one side of a transparent substrate (here, the non-conjugated vinylidene group-containing compound is free from a (meth)acrylate monomer).

[17] It is preferable that the non-conjugated vinylidene group-containing compound be a compound represented by the following general formula (1) in the compound lens according to [16]:

General Formula (1)

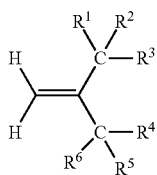

wherein $R^{11}$, $R^{12}$, $R^{15}$, and $R^{16}$ each independently represent a substituent and A represents an atomic group necessary for forming a cyclic structure.
[18] It is preferable that the transparent substrate be a glass material in the compound lens according to [16] or [17].
[19] It is preferable that the transparent substrate be a glass lens in the compound lens according to [16] or [17].
[20] A compound lens which is manufactured by the method according to any one of [1] to [15].

According to the present invention, it is possible to provide a method of manufacturing a compound lens with an excellent transfer property, a small number of bubble mixtures, and excellent heat resistance and crack resistance.

DESCRIPTION OF EMBODIMENTS

Hereinafter, a compound lens of the present invention, a method of manufacturing the same, and materials to be used for the same will be described in detail.

The description of the constituent elements described below is made based on typical embodiments of the present invention, but the present invention is not limited thereto. In this description, the numerical range expressed by the wording "a number to another number" in the present specification means a range that falls between the former number indicating the lower limit of the range and the latter number indicating the upper limit thereof.

[Method of Manufacturing a Compound Lens]

A method of manufacturing a compound lens of the present invention includes a thermal polymerization process of heating and pressing a semi-cured product of a curable resin composition containing a (meth)acrylate monomer, a non-conjugated vinylidene group-containing compound, and a photo-radical initiator and a transparent substrate arranged so as to be in contact with the semi-cured product in a state in which a molding die is filled with the semi-cured product and the transparent substrate, and obtaining a cured product by allowing the semi-cured product to be thermally polymerized (here, a non-conjugated vinylidene group-containing compound is free from a (meth)acrylate monomer).

Since a curable resin in the related art is instantly cured by heat or UV rays, the transfer property thereof is poor at the time when the curable resin is allowed to be cured by being combined with a transparent substrate. In addition, bubbles are mixed while a compound lens is prepared so that the percentage of defective products is likely to be increased. Further, since residual stress remains at the time of curing, usage that requires environmental resistance has not been realized. In contrast, in the present invention, the transfer property can be secured because a semi-cured product is prepared and then cured. Moreover, by the composition of the semi-cured product, the percentage of defective product can be reduced by eliminating bubble mixture at the time of preparation and the environmental resistance can be significantly improved. It is not intended that the present invention adheres to any theories, but deformability of a semi-cured product and heat resistance can be provided so that the above-described problems can be solved by controlling a three-dimensional structure through chain transfer in polymerization of non-conjugated vinylidene group-containing compound monomers.

Here, in the present specification, the term "semi-cured product" means a product which is obtained by polymerizing a curable resin composition, not completely solid, and in a state of having liquidity to some extent. For example, a polymer, to which photo-irradiation and/or heating is applied, of the curable resin composition having a complex viscosity of $10^5$ mPa·s to $10^8$ mPa·s at a frequency of 10 Hz at 25° C. is a semi-cured product. The present invention is not particularly limited, but it is considered that a product having an upper limit of the complex viscosity of 1.0 mPa·s to $10^9$ mPa·s at a frequency of 10 Hz at 25° C. is a semi-cured product. On the other hand, the term "cured product" is a product obtained by polymerizing curable resin composition in a state of a complete solid.

Hereinafter, respective materials and respective processes used for the method of manufacturing a compound lens of the present invention will be described in order.

(1) Process of Forming Semi-Cured Product

In the method of manufacturing a compound lens of the present invention, a semi-cured product of a curable resin composition and a transparent substrate arranged so as to be in contact with the semi-cured product are disposed such that a molding die is filled with the semi-cured product and the transparent substrate.

Here, the semi-cured product of the curable resin composition may be obtained by using any method, but it is preferable to include a process of performing at least one of photo-irradiation or heating on a curable resin composition containing a non-conjugated vinylidene group-containing compound and a photo-radical initiator and forming a semi-cured product of the curable resin composition (hereinafter, referred to as a process of forming a semi-cured product).

The process of forming the semi-cured product may be performed before or after the molding die is filled with the semi-cured product of the curable resin composition. That is, the curable resin composition may be directly disposed in the molding die used for a thermal polymerization process described below or the curable resin composition may be put into a die different from the molding die used for the thermal polymerization process described below to manufacture a semi-cured product and then moved to the molding die used for the thermal polymerization process described below.

Here, the molding die is generally designed that the content therein could be heated under pressure by the combination of the two molding dies. When a low-viscosity composition is injected into the molding die, the curable resin composition may leak out through the molding die clearance. The curable resin composition used for the method of manufacturing a compound lens of the present invention generally has a low viscosity and therefore it is difficult to directly inject the composition into a molding die. Consequently, in one preferred embodiment of the present invention, a polymer having at least one polymerizable group selected from a methacryl group, an allyl group, an acryl group, and a vinyl group in the side chain thereof is further added to the curable resin composition to adjust the viscosity of the composition, and thermal polymerization described below and semi-curing are performed in one molding die to obtain a cured product, which is preferable from the viewpoint of the productivity.

In a case where the process of forming the semi-cured product is performed after the molding die is filled with the semi-cured product of the curable resin composition, the curable resin composition may be semi-cured in a state of not being in contact with the transparent substrate or in a state of being in contact with the transparent substrate, but it is preferable that the curable resin composition be semi-cured in a state of being in contact with the transparent substrate from a viewpoint of reducing the number of bubble mixtures.

Meanwhile, in a case where a semi-cured product is formed before the molding die is filled with the semi-cured product of the curable resin composition, the method of manufacturing a compound lens of the present invention includes filling the molding die with the semi-cured product of the curable resin composition and laminating the transparent substrate on the surface of the semi-cured product of the curable resin composition on the side which is not in contact with the molding die. At this time, the process of forming a semi-cured product of the curable resin composition can be performed on a die different from the molding die or an arbitrary support. When the curable resin composition is semi-cured, it is preferable that the curable resin composition be put into a die different from the molding die used for the thermal polymerization process described below to manufacture a semi-cured product and moved to the molding die used for the thermal polymerization process described below from a viewpoint of reducing material cost.

In the case where a die different from the molding die is used, a die for preform is preferred. The die for preform may be formed of metal, or may be formed of glass or resin. In consideration of using the die repeatedly in a mass-production line, the die for preform is preferably formed of metal or glass. In a case where the semi-cured product of the present invention is used for lenses, it is preferable that at least one side of the die for preform has a shape that is the same as and/or similar to the shape of the molding die, and more preferably, both sides of the die have a shape that is the same as and/or similar to the shape of the molding die.

Of the above, in the present invention, it is preferable that the process of forming a semi-cured product be performed after the molding die is filled with the semi-cured product of the curable resin composition from a viewpoint of reducing the number of bubble mixtures and simplifying the manufacturing process.

At this time, it is preferable that the process of filling the molding die with the curable resin composition in a state of being in contact with the transparent substrate be a process of filling the molding die with the curable resin composition and laminating the transparent substrate on the surface of the curable resin composition on the side which is not in contact with the molding die.

<<Curable Resin Composition>>

In the process of forming the semi-cured product, at least one of photo-irradiation and heating is performed on the curable resin composition.

From the viewpoint of reducing the number of bubble mixtures of the curable resin composition, it is preferable that the liquid viscosity of the curable resin composition be controlled to be within a specific range. The liquid viscosity (liquid viscosity before semi-curing) of the curable resin composition is preferably 1000 mPa·s to 20000 mPa·s, more preferably 3000 mPa·s to 15000 mPa·s, and particularly preferably 40000 mPa·s to 12000 mPa·s. In order to control the liquid viscosity of the curable resin composition, it is preferable to change the composition of the curable resin composition.

Hereinafter, the composition of the curable resin composition will be described.

<Non-conjugated Vinylidene Group-containing Compound>

The curable resin composition contains a non-conjugated vinylidene group-containing compound (here, the non-conjugated vinylidene group-containing compound is free from a (meth)acrylate monomer).

In the present invention, the viscosity of the semi-cured product after photo- or thermal polymerization can be controlled to be within a specific range and the heat resistance and the yield of the compound lens obtained when the thermal polymerization is performed on the semi-cured product in the method of manufacturing a cured product of the present invention described below can be improved using the curable resin composition containing such a non-conjugated vinylidene group-containing compound.

It is preferable that the non-conjugated vinylidene group-containing compound be represented by the following general formula (0).

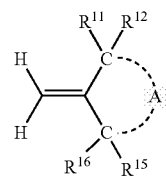

In the general formula (0), $R^1$ to $R^6$ each independently represent a substituent. At least one of $R^1$ to $R^6$ forms a ring, or at least two of $R^1$ to $R^6$ bond to each other to form a ring.

Examples of the substituent to be represented by $R^1$ to $R^6$, which are not particularly limited, include the following substituents: a hydrogen atom, a halogen atom, a halogenoalkyl group, an alkyl group, an alkenyl group, an acyl group, a hydroxyl group, a hydroxyalkyl group, an aromatic ring group, a heteroaromatic ring group, and an alicyclic group.

Among these, $R^1$ to $R^6$ each independently preferably represent a substituent composed of hydrogen atoms, oxygen atoms, and carbon atoms alone, and more preferably a substituent composed of hydrogen atoms and carbon atoms alone. Specifically, $R^1$ to $R^6$ each are preferably a hydrogen atom, an alkyl group or an alkenyl group, more preferably a hydrogen atom, an alkyl group having 1 to 5 carbon atoms, or an alkenyl group having 2 to 5 carbon atoms.

Regarding the expression of the group (atomic group) in the present specification, the group with no expression of substitution or unsubstitution is meant to include both an unsubstituted group and a substituted group. For example, "alkyl group" includes not only an alkyl group with no substituent (unsubstituted alkyl group) but also an alkyl group with a substituent (substituted alkyl group).

The ring to be formed by $R^1$ to $R^6$ may be an aromatic ring or a heteroaromatic ring, and may also be a non-aromatic ring. Above all, the ring to be formed by $R^1$ to $R^6$ is preferably a non-aromatic ring, more preferably a non-aromatic hydrocarbon ring. The ring to be formed by $R^1$ to $R^6$ may have a substituent, and for example, the substituent is preferably an alkyl group having 1 to 5 carbon atoms, more preferably a methyl group, an ethyl group, an n-propyl group or an isopropyl group. In a case where the ring to be formed by $R^1$ to $R^6$ has substituents, the substituents may bond to each other to form a condensed ring.

In addition, the non-conjugated vinylidene group-containing compound may have one ring or multiple rings formed by $R^1$ to $R^6$ therein. In a case where the compound has multiple rings formed by $R^1$ to $R^6$, the rings may be multiple rings independent of each other, or those independent multiple rings may be condensed to form a condensed ring, or in a case where one ring has additional substituents as described above, the substituents may bond to each other to form a condensed ring. Above all, the ring to be formed by $R^1$ to $R^6$ is more preferably a condensed ring formed through condensation of multiple rings; and in a case where one ring has additional substituents, more preferably, the substituents bond to each other to form a condensed ring. In the present specification, an embodiment where two rings form spiro-condensation like the compound (B-2) described below is also within the scope of the concept of the condensed ring here.

Further, the non-conjugated vinylidene group-containing compound preferably contains a condensed ring formed through condensation of 2 to 5 rings and more preferably a condensed ring formed through condensation of 2 or 3 rings.

Moreover, the number of the ring-constituting members of the condensed ring is preferably 3 to 10, more preferably 3 to 9, and still more preferably 4 to 9.

In addition, among $R^1$ to $R^6$, (A) at least one forms a ring, or (B) at least two bond to each other to form a ring. Among $R^1$ to $R^6$, in the non-conjugated vinylidene group-containing compound, preferred is the case (B) where at least two bond to each other to form a ring. More preferred embodiments of the non-conjugated vinylidene group-containing compound are described below, as divided in those two cases of (A) and (B).

First, described is the case (A) where at least one of $R^1$ to $R^6$ forms a ring.

In the case (A), preferably, any two of $R^1$ to $R^3$ in those $R^1$ to $R^6$ bond to each other to form a ring, or any two of $R^4$ to $R^6$ bond to each other to form a ring. In this case, more preferably, either of any two of $R^1$ to $R^3$ or any two of $R^4$ to $R^6$ bond to each other to form a ring, and at this time, more preferably, the others not bonding to each other and therefore not forming a ring of any two of $R^1$ to $R^3$ or any two of $R^4$ to $R^6$ are all hydrogen atoms (for example, in the case where any two of $R^1$ to $R^3$ bond to each other to form a ring, preferably, $R^4$ to $R^6$ are all hydrogen atoms).

Next, the case (B) where at least two of $R^1$ to $R^6$ bond to each other to form a ring is described.

In the case (B), preferably, the non-conjugated vinylidene group-containing compound is represented by the following general formula (1).

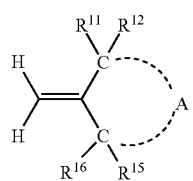

General Formula (1)

In the general formula (1), $R^{11}$, $R^{12}$, $R^{15}$ and $R^{16}$ each independently represent a substituent and A represents an atomic group necessary for forming a cyclic structure.

In the general formula (1), the preferred range of the substituent represented by $R^{11}$, $R^{12}$, $R^{15}$ and $R^{16}$ is the same as that of the substituent represented by $R^1$ to $R^6$ described above. $R^{11}$, $R^{12}$, $R^{15}$ and $R^{16}$ may bond to each other to form a ring, and the ring may have a substituent.

Of the carbon atom to which $R^{11}$ and $R^{12}$ bond, and the carbon atom to which $R^{15}$ and $R^{16}$ bond, one carbon atom is preferably an asymmetric carbon atom.

At least one of the two substituents in any one group alone of the group of $R^{11}$ and $R^{12}$ and the group of $R^{15}$ and $R^{16}$ is preferably a hydrogen atom, and both the two substituents in any one group alone are more preferably hydrogen atoms.

Preferably, the substituent is a hydrogen atom or a hydrocarbon group having 1 to 5 carbon atoms, and the hydrocarbon group having 1 to 5 carbon atoms does not form a ring. Also preferably, one of $R^{11}$ and $R^{12}$ is a hydrogen atom or a hydrocarbon group having 1 to 5 carbon atoms, and the hydrocarbon group having 1 to 5 carbon atoms does not form a ring.

In the general formula (1), A represents an atomic group necessary for forming a cyclic structure, and the cyclic structure is not particularly limited and may be any known cyclic structure. Examples of the cyclic structure include an alicyclic ring (non-aromatic hydrocarbon ring), an aromatic ring, a hetero ring, and a lactone ring containing —CO—.

Of those, preferably, A is an atomic group necessary for forming an alicyclic ring having 4 to 10 carbon atoms including the carbon atoms bonding to A and the carbon atom constituting the non-conjugated vinylidene group of the general formula (1), and particularly preferably, A is an atomic group necessary for forming an alicyclic ring having 5 to 9 carbon atoms including the carbon atoms bonding to A and the carbon atom constituting the non-conjugated vinylidene group of the general formula (1). The alicyclic ring may further have a substituent, and the preferred substituents are the same as those that the ring to be formed by $R^1$ to $R^6$ may have. A may be an unsaturated alicyclic ring or a saturated alicyclic ring, but preferably, the non-conjugated vinylidene group-containing compound has at least one unsaturated bond as a whole. Further, A may form a condensed ring along with the substituent represented by $R^{11}$, $R^{12}$, $R^{15}$ and $R^{16}$.

In the general formula (1) in the present invention, particularly preferably, $R^{11}$, $R^{12}$, $R^{15}$ and $R^{16}$ each independently represent a substituent composed of hydrogen atoms and carbon atoms alone, and A represents an alicyclic (nonaromatic hydrocarbon) structure.

In the present invention, preferably, the non-conjugated vinylidene group-containing compound has any other alkenyl group in addition to the vinylidene group (non-conjugated vinylidene group). The position of the vinylidene group other than the non-conjugated vinylidene group in the non-conjugated vinylidene group-containing compound is not particularly limited. However, preferably, the non-conjugated vinylidene group-containing compound has the vinylidene group other than the non-conjugated vinylidene group on the ring formed by $R^1$ to $R^6$. That is, the ring formed by $R^1$ to $R^6$ preferably includes at least one unsaturated hydrocarbon ring, and particularly preferably the ring includes at least one unsaturated hydrocarbon ring that has only one double bond.

Specific examples of the non-conjugated vinylidene group-containing compound preferably used for the invention are shown below, but the present invention is not limited to the compounds described below.

Non-conjugated Vinylidene Group-containing Compound

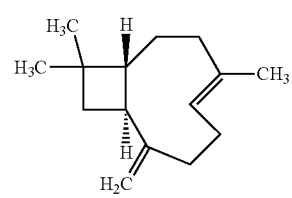

(B-1)

(B-2)
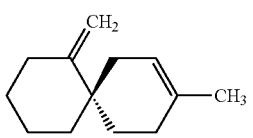

(B-3)
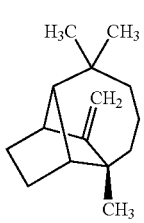

(B-4)
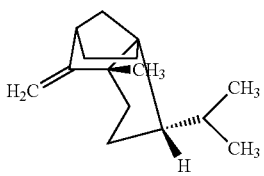

(B-5)
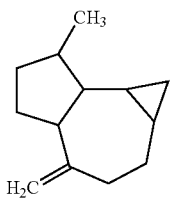

(B-6)
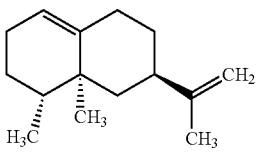

(B-7)
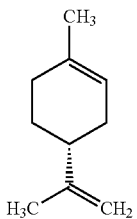

(B-8)
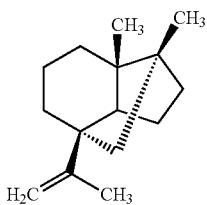

(Molecular Weight)

The molecular weight of the non-conjugated vinylidene group-containing compound is preferably 100 to 400, more preferably 120 to 350, and particularly preferably 130 to 300.

(Obtaining Method)

The method of obtaining these non-conjugated vinylidene group-containing compounds is not particularly limited, and the compound may be commercially available or may be produced through synthesis.

In a case of commercially obtaining the compound, for example, β-caryophyllene (chemical formula: B-1) (by Tokyo Chemical Industry) can be preferably used.

In a case of producing the compound through synthesis, the method of manufacturing the non-conjugated vinylidene group-containing compound is not particularly limited and the compound may be produced in any known method. For example, among the non-conjugated vinylidene group-containing compounds, in a case where the compound (B-1) which can be preferably used for the present invention is synthesized, the compound (B-1) can be synthesized according to the method described in J. Am. Chem. Soc. 85, 362 (1964), and Tetrahedron Lette., 24, 1885 (1983).

In the present invention, the curable resin composition preferably contains the non-conjugated vinylidene group-containing compound in an amount of 0.5% by mass to 30% by mass, more preferably 1% by mass to 25% by mass, and particularly preferably 2% by mass to 20% by mass with respect to the total amount of the curable resin composition.

<(Meth)Acrylate Monomer>

The method of manufacturing a compound lens of the present invention uses a curable resin composition containing a (meth)acrylate monomer. In the present specification, "(meth)acrylate" expresses acrylate and methacrylate; "(meth)acryl" expresses acryl and methacryl; and "(meth)acryloyl" expresses acryloyl and methacryloyl. Further, in the present specification, "monomer" in Chinese characters and "monomer" in Katakana have the same definition as each other. In the present specification, monomer is differentiated from oligomer and polymer and is a compound having a weight-average molecular weight of 1000 or less.

Preferably, the (meth)acrylate monomer contains a (meth)acrylate monomer having an alicyclic structure. That is, it is preferable that the (meth)acrylate monomer be represented by the following general formula (3) or (4).

General Formula (3)
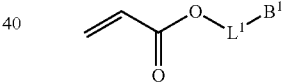

In the general formula (3), $L^1$ represents a single bond or a divalent linking group; and $B^1$ represents a monovalent alicyclic group.

$L^1$ is preferably a single bond or a divalent alkylene group, more preferably a single bond or a methylene group, and particularly preferably a single bond.

$B^1$ is preferably a monovalent alicyclic group having 5 to 15 carbon atoms, more preferably a monovalent alicyclic group having 7 to 15 carbon atoms, and particularly preferably a monovalent alicyclic group having 8 to 12 carbon atoms. $B^1$ is preferably a condensed ring formed through condensation of two or more rings, and more preferably a condensed ring formed through condensation of 2 or 3 rings. In addition, preferably, $B^1$ does not have a double bond in the alicyclic structure.

General Formula (4)
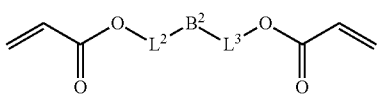

In the general formula (4), $L^2$ and $L^3$ each independently represent a single bond or a divalent linking group; and $B^2$ represents a divalent alicyclic group.

Preferably, $L^2$ and $L^3$ each independently represent a single bond or a divalent alkylene group, more preferably a single bond or a methylene group, and particularly preferably a methylene group.

$B^2$ is preferably a divalent alicyclic group having 5 to 15 carbon atoms, more preferably a divalent alicyclic group having 7 to 15 carbon atoms, and particularly preferably a divalent alicyclic group having 8 to 12 carbon atoms. $B^1$ is preferably a condensed ring formed through condensation of two or more rings, and more preferably a condensed ring formed through condensation of 2 or 3 rings. Preferably, $B^2$ does not have a double bond in the alicyclic structure.

The (meth)acrylate monomer can be divided into a polyfunctional (meth)acrylate monomer and a monofunctional (meth)acrylate monomer. Here, the polyfunctional (meth)acrylate monomer is a (meth)acrylate monomer having multiple functional groups, and the monofunctional (meth)acrylate monomer is a (meth)acrylate monomer having one functional group. Further, in the present specification, the "functional group of (meth)acrylate monomers" means an ethylenic unsaturated bond that participates in polymerization reaction.

(Polyfunctional (Meth)Acrylate Monomer)

Examples of the polyfunctional (meth)acrylate monomer used for the present invention include the followings: tricyclodecanedimethanol di(meth)acrylate, diethylene glycol monoethyl ether (meth)acrylate, dimethyloldicyclopentane di(meth)acrylate, di(meth)acrylated isocyanurate, 1,3-butylene glycol di(meth)acrylate, 1,4-butanediol di(meth)acrylate, EO-modified 1,6-hexanediol di(meth)acrylate, ECH-modified 1,6-hexanediol di(meth)acrylate, allyloxypolyethylene glycol (meth)acrylate, 1,9-nonanediol di(meth)acrylate, EO-modified bisphenol A di(meth)acrylate, PO-modified bisphenol A di(meth)acrylate, modified bisphenol A di(meth)acrylate, EO-modified bisphenol F di(meth)acrylate, ECH-modified hexahydrophthalic acid di(meth)acrylate, hydroxypivalic acid neopentylglycol di(meth)acrylate, neopentylglycol di(meth)acrylate, EO-modified neopentylglycol di(meth)acrylate, propylene oxide (hereinafter referred to as "PO")-modified neopentylglycol di(meth)acrylate, stearic acid-modified pentaerythritol di(meth)acrylate, ECH-modified phthalic acid di(meth)acrylate, ECH-modified propylene glycol di(meth)acrylate, silicone di(meth)acrylate, triethylene glycol di(meth)acrylate, tetraethylene glycol di(meth)acrylate, dimethyloltricyclodecane di(meth)acrylate, neopentylglycol-modified trimethylolpropane di(meth)acrylate, tripropylene glycol di(meth)acrylate, EO-modified tripropylene glycol di(meth)acrylate, triglycerol di(meth)acrylate, dipropylene glycol di(meth)acrylate, ECH-modified glycerol tri(meth)acrylate, EO-modified glycerol tri(meth)acrylate, PO-modified glycerol tri(meth)acrylate, pentaerythritol tri(meth)acrylate, EO-modified phosphoric acid tri(meth)acrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl) isocyanurate, dipentaerythritol hexa(meth)acrylate, caprolactone-modified dipentaerythritol hexa(meth)acrylate, dipentaerythritol hydroxypenta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritol ethoxytetra(meth)acrylate, and pentaerythritol tetra(meth)acrylate.

Of those, in the present invention, a polyfunctional (meth)acrylate monomer having an alicyclic structure is preferably used, more preferably a divalent (meth)acrylate monomer having an alicyclic structure, particularly preferably tricyclodecanedimethanol di(meth)acrylate, and more particularly preferably tricyclodecanedimethanol diacrylate.

(Monofunctional (Meth)Acrylate Monomer)

Examples of the monofunctional (meth)acrylate monomer include the followings: adamantyl (meth)acrylates such as 1-adamantyl (meth)acrylate, etc.; norbornyl (meth)acrylates such as isobornyl (meth)acrylate, etc.; tricyclodecane (meth)acrylates such as tricyclo[$5,2,1,0^{2,6}$]dec-8-yl acrylate, etc.; 2-ethyl-2-butylpropanediol (meth)acrylate, 2-ethylhexyl (meth)acrylate, 2-ethylhexylcarbitol (meth)acrylate, 2-hydroxybutyl (meth)acrylate, 2-hydroxyethyl (meth)acrylate, 2-hydroxypropyl (meth)acrylate, 2-methoxyethyl (meth)acrylate, 3-methoxybutyl (meth)acrylate, 4-hydroxybutyl (meth)acrylate, benzyl (meth)acrylate, 1- or 2-naphthyl (meth)acrylate, butanediol mono(meth)acrylate, butoxyethyl (meth)acrylate, butyl (meth)acrylate, cetyl (meth)acrylate, ethyleneoxide-modified (hereinafter referred to as "EO") cresol (meth)acrylate, dipropylene glycol (meth)acrylate, ethoxylated phenyl (meth)acrylate, ethyl (meth)acrylate, isoamyl (meth)acrylate, isobutyl (meth)acrylate, isooctyl (meth)acrylate, cyclohexyl (meth)acrylate, dicyclopentanyl (meth)acrylate, dicyclopentanyloxyethyl (meth)acrylate, isomyristyl (meth)acrylate, lauryl (meth)acrylate, methoxydipropylene glycol (meth)acrylate, methoxytripropylene glycol (meth)acrylate, methoxypolyethylene glycol (meth)acrylate, methoxytriethylene glycol (meth)acrylate, methyl (meth)acrylate, neopentyl glycol benzoate (meth)acrylate, nonylphenoxypolyethylene glycol (meth)acrylate, nonylphenoxypolypropylene glycol (meth)acrylate, octyl (meth)acrylate, paracumylphenoxyethylene glycol (meth)acrylate, epichlorohydrin (hereinafter referred to as "ECH")-modified phenoxy (meth)acrylate, phenoxyethyl (meth)acrylate, phenoxydiethylene glycol (meth)acrylate, phenoxyhexaethylene glycol (meth)acrylate, phenoxytetraethylene glycol (meth)acrylate, stearyl (meth)acrylate, EO-modified succinic acid (meth)acrylate, tert-butyl (meth)acrylate, tribromophenyl (meth)acrylate, EO-modified tribromophenyl (meth)acrylate, and tridodecyl (meth)acrylate.

Of those, preferred is the use of a monofunctional (meth)acrylate monomer having an alicyclic structure, more preferred are 1-adamantyl (meth)acrylate, isoboronyl (meth)acrylate and tricyclo[$5,2,1,0^{2,6}$]dec-8-yl (meth)acrylate, and particularly preferred is 1-adamantyl methacrylate.

The (meth)acrylate monomer may be a mixture of a polyfunctional (meth)acrylate monomer or a polyfunctional (meth)acrylate monomer and a monofunctional (meth)acrylate monomer.

Specific examples of the (meth)acrylate monomer preferably used for the present invention are described below, but the present invention is not limited to the compounds described below.

Polyfunctional (Meth)Acrylic Monomer

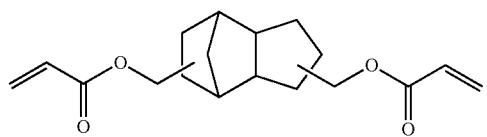

(Aa-1)

-continued (Aa-2)
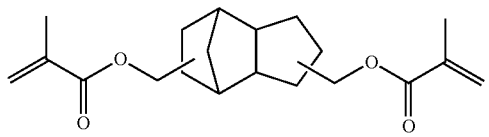

Monofunctional (Meth)Acrylic Monomer (Ab-1)
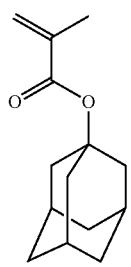

(Ab-2)
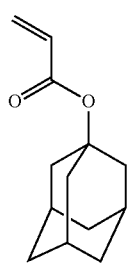

(Ab-3)
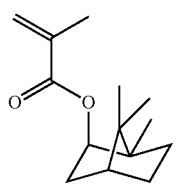

(Ab-4)
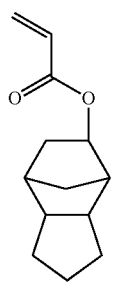

(Ab-5)
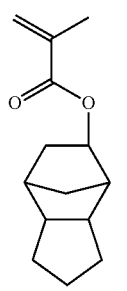

(Molecular Weight)

The molecular weight of the (meth)acrylate monomer preferably used for the present invention is preferably 100 to 500, more preferably 150 to 400, and particularly preferably 200 to 400.

(Obtaining Method)

The method for obtaining these (meth)acrylate monomers is not particularly limited, and the monomer may be commercially available or may be produced through synthesis.

In a case of commercially obtaining the monomer, for example, tricyclodecane-dimethanol diacrylate (chemical formula: Aa-1) (manufactured by Shin-Nakamura Chemical Industry) can be preferably used.

In a case of manufacturing the monomer through synthesis, the method of manufacturing the (meth)acrylate monomer is not particularly limited and the monomer may be synthesized in any known method.

In the method of manufacturing a compound lens of the present invention, the curable resin composition preferably contains the (meth)acrylate monomer in an amount of 50% by mass to 95% by mass, more preferably 55% by mass to 90% by mass, and particularly preferably 60% by mass to 90% by mass with respect to the total amount of the curable resin composition.

<Photo-radical Polymerization Initiator>

In the method of manufacturing a compound lens of the present invention, the curable resin composition contains a photo-radical polymerization initiator. As the photo-radical polymerization initiator, which is not particularly limited, any known photo-radical polymerization initiator can be used.

Specific examples of the photo-radical polymerization initiator include the following compounds: bis(2,6-dimethoxybenzoyl)-2,4,4-trimethylpentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, bis(2,6-dichlorobenzoyl)-2,4,4-trimethylpentylphosphine oxide, 1-phenyl2-hydroxy-2-methylpropane-1-one, 1-hydroxycyclohexyl phenyl ketone, 1-(4-isopropylphenyl)-2hydroxy-2-methylpropane-1-one, 1,2-diphenylethane-dione, methylphenyl glyoxylate, 1-[4-(2-hydroxyethoxy)-phenyl]-2-hydroxy-2-methyl-1-propane-1-one, 2-hydroxy-1-{4-[4-(2-hydroxy-2-methyl-propionyl)-benzyl]phenyl}-2-methyl-propane-1-one, 2,2-dimethoxy-1,2-diphenylethane-1-one, 2-methyl-1-(4-methylthiophenyl)-2-morpholinopropane-1-one, 2-benzyl-2-dimethylamino-1-(4-morpholinophenyl)-butanone-1,2,4,6-trimethylbenzoyl-diphenyl-phosphine oxide, and bis(2,4,6-trimethylbenzoyl)-phenylphosphine oxide.

Of the above, IRGACURE 184 (1-hydroxycyclohexyl phenyl ketone, manufactured by BASF Corporation) can be preferably used for the photo-radical polymerization initiator in the present invention.

Not particularly limited, the addition amount of the photo-radical polymerization initiator in the curable resin composition is preferably from 0.01% by mass to 5% by mass, more preferably from 0.05% by mass to 1.0% by mass, and particularly preferably from 0.05% by mass to 0.5% by mass with respect to the total amount of the curable resin composition (preferably, the total of the (meth)acrylate monomer, the non-conjugated vinylidene group-containing compound, and the polymer having a non-conjugated vinyl group in the side chain thereof to be described below).

<Thermal Radical Polymerization Initiator>

It is preferable that the curable resin composition contain a thermal radical polymerization initiator in the method of manufacturing a compound lens of the present invention.

Since such a thermal radical polymerization initiator is previously added to the curable resin composition, a cured product having high heat resistance can be easily manufactured with excellent moldability and productivity through thermal polymerization using the semi-cured product.

Specific examples of thermal radical polymerization initiator include the following compounds: 1,1-di(t-hexylperoxy)cyclohexane, 1,1-di(t-butylperoxy)cyclohexane, 2,2-di (4,4-di-(t-butylperoxy)cyclohexyl)propane, t-hexylperoxyisopropyl monocarbonate, t-butylperoxy 3,5, 5-trimethylhexanoate, t-butylperoxy laurate, dicumyl peroxide, di-t-butyl peroxide, t-butylperoxy-2-ethylhexanoate, t-hexylperoxy-2-ethylhexanoate, cumene hydroperoxide, t-butyl hydroperoxide, and 2,3-dimethyl-2,3-diphenylbutane.

Above all, in the present invention, it is preferable to use a hydroperoxide-based thermal radical polymerization initiator having a hydroperoxide group in the molecule as the thermal radical polymerization initiator, and more preferable to use at least one of hydroperoxide-based thermal radical polymerization initiator having a hydroperoxide group in the molecule and at least one of non-hydroperoxide-based thermal radical polymerization initiator with no hydroperoxide group in the molecule.

In the present invention, perbutyl O (t-butylperoxy 2-ethylhexanoate, manufactured by NOF Corporation) is preferred as the non-hydroperoxide-based thermal radical polymerization initiator, and percumyl H (cumene hydroperoxide, manufactured by NOF Corporation) is preferred as the hydroperoxide-based thermal radical polymerization initiator.

The reason why use of the hydroperoxide-based thermal radical polymerization initiator having a hydroperoxide group in the molecule is preferred as the thermal radical polymerization initiator is because the hydroperoxide-based thermal radical polymerization initiator has an effect of promoting chain transfer during polymerization of non-conjugated vinylidene group-containing compound monomer by which the three-dimensional structure of the resulting polymer can be more favorably controlled and the semi-cured product can be given good deformability. In a case where such a hydroperoxide-based thermal radical polymerization initiator is used, the temperature at which thermal radical polymerization is initiated is generally high, and therefore in such a case, it is more preferable that the hydroperoxide-type thermal radical polymerization initiator is used along with a non-hydroperoxide-based thermal radical polymerization initiator having a low thermal polymerization initiation temperature.

Not particularly limited, the amount of the thermal radical polymerization initiator added to the curable resin composition is preferably from 0.01% by mass to 5.0% by mass, more preferably from 0.1% by mass to 4.0% by mass, and particularly preferably from 0.3% by mass to 3.0% by mass with respect to the total of the (meth)acrylate monomer, the non-conjugated vinylidene group-containing compound, and the polymer having a non-conjugated vinyl group described below in the side chain thereof.

<Polymer Having at Least One Polymerizable Group Selected from Methacryl Group, Allyl Group, Acryl Group, and Vinyl Group in Side Chain Thereof>

In the method of manufacturing a semi-cured product of the present invention, it is preferable to contain a polymer having at least one polymerizable group selected from a methacryl group, an allyl group, an acryl group, and a vinyl group in the side chain thereof from a viewpoint that the viscosity of the curable resin composition before photo-irradiation and/or heating is adjusted to be high such that molding die clearance leakage can be prevented in the case where the curable resin composition is directly placed in the molding die before photo-irradiation and/or heating.

In addition, the polymer having at least one polymerizable group selected from a methacryl group, an allyl group, an acryl group, and a vinyl group in the side chain thereof may be a homopolymer or a copolymer. In a case of the copolymer, at least one copolymer component may include at least one polymerizable group selected from a methacryl group, an allyl group, an acryl group, and a vinyl group in the side chain thereof.

Hereinafter, specific examples of the polymer having at least one polymerizable group selected from a methacryl group, an allyl group, an acryl group, and a vinyl group in the side chain thereof which is preferably used for the present invention will be described, but the present invention is not particularly limited to the following compounds.

Polymer Having Non-conjugated Vinyl Group in Side Chain Thereof

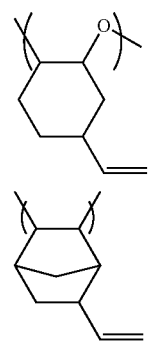

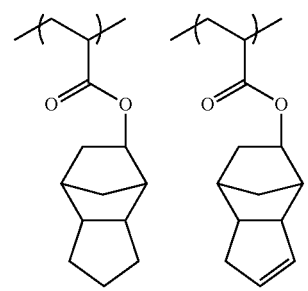

Polymer Having Methacryl Group in Side Chain Thereof

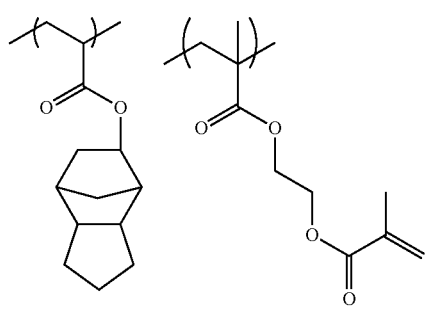

-continued

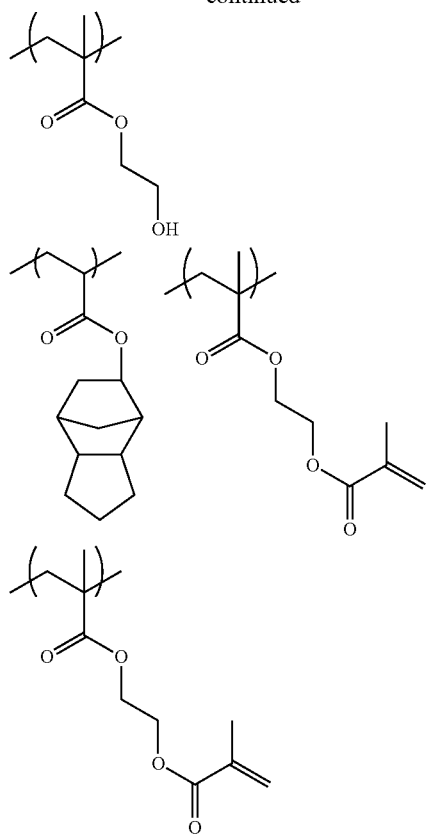

Polymer Having Allyl Group in Side Chain Thereof

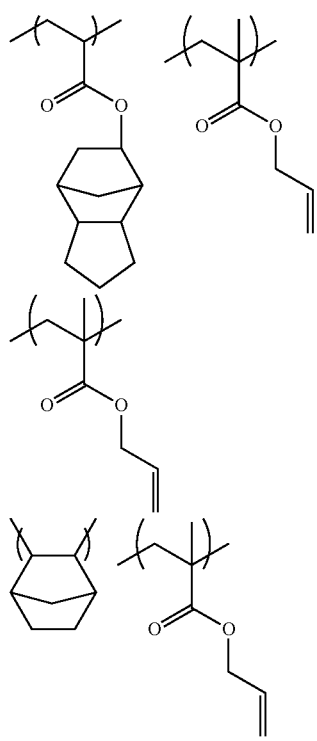

Polymer Having Acryl Group in Side Chain Thereof

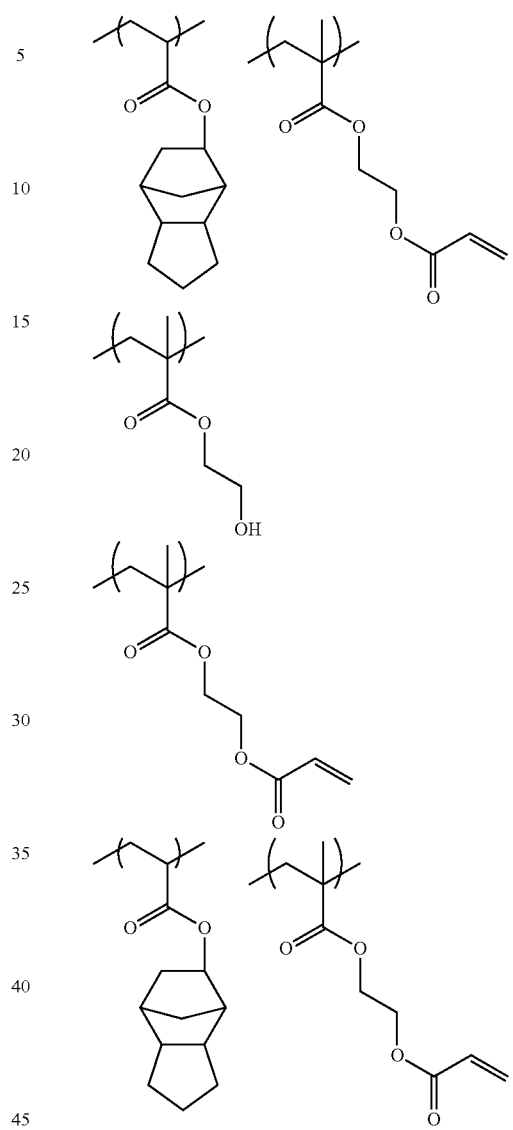

(Molecular Weight)

The molecular weight of the polymer having at least one polymerizable group selected from a methacryl group, an allyl group, an acryl group, and a vinyl group in the side chain thereof is preferably 1000 to 10000000, more preferably 2000 to 170000, and particularly preferably 4000 to 150000.

(Tg)

The glass transition temperature (hereinafter, also referred to as Tg) of the polymer having at least one polymerizable group selected from a methacryl group, an allyl group, an acryl group, and a vinyl group in the side chain thereof is preferably 50° C. to 400° C., more preferably 70° C. to 350° C., and particularly preferably 100° C. to 300° C.

In the method of manufacturing a compound lens of the present invention, the content ratio of the polymer having at least one polymerizable group selected from a methacryl group, an allyl group, an acryl group, and a vinyl group in the side chain thereof is preferably 5% by mass to 50% by mass, more preferably 10% by mass to 50% by mass, and particularly preferably 20% by mass to 35% by mass with respect to the total amount of the curable resin composition (preferably, the total amount of the meth)acrylate monomer, the non-conjugated vinylidene group-containing compound, the photo-radical polymerization initiator, the thermal radical polymerization initiator, and the polymer having at least one polymerizable group selected from a methacryl group, an allyl group, an acryl group, and a vinyl group in the side chain thereof). It is preferable that the content ratio of the polymer having the non-conjugated vinyl group in the side chain thereof be 50% by mass or less with respect to the total amount of the curable resin composition, from a viewpoint of controlling the initial viscosity of the curable resin composition before photo-irradiation and/or heating to facilitate dispensation or the like.

<Other Additives>

The curable resin composition may contain additives, for example, an adhesion improving agent of the interface of a resin-transparent substrate (particularly, glass) such as a resin, monomer, dispersant, plasticizer, thermal stabilizer, release agent and silane coupling agent not satisfying the conditions of the present invention within the range not departing from the scope of the present invention.

The adhesion of the interface of a glass-transparent substrate can be improved and durability in respective environmental tests is further improved by means of using the silane coupling agent. The silane coupling agent may be mixed into the curable resin composition, but a surface treatment may be carried out on the transparent substrate (particularly, glass) using the silane coupling agent in advance. Examples of organic functional groups in the silane coupling agent include a vinyl group, an acryl group, a methacryl group, an epoxy group, and an amino group, and specific examples thereof include vinyl trimethoxy silane, 3-acryloxypropyltrimethoxysilane, 3-methacryloxypropylmethyldimethoxysilane, 3-glycidoxypropylmethyldimethoxysilane, and 3-aminopropyltrimethoxysilane, and, for example, 3-acryloxypropyltrimethoxysilane is preferably used.

<Semi-curing Process>

(Condition of Photo-irradiation)

Preferred conditions of photo-irradiation in the method of manufacturing a compound lens of the present invention will be described below.

Preferably, the photo-irradiation is carried out so that the semi-cured product after the photo-irradiation preferably has a complex viscosity of $10^5$ mPa·s to $10^8$ mPa·s at a frequency of 10 Hz at 25° C., more preferably $10^{5.2}$ mPa·s to $10^{7.5}$ mPa·s, and particularly preferably $10^{5.5}$ mPa·s to $10^{7.5}$ mPa·s.

Light used for the photo-irradiation is preferably UV rays or visible rays, and more preferably UV rays. For example, a metal halide lamp, a low-pressure mercury lamp, a high-pressure mercury lamp, an ultra-high-pressure mercury lamp, a bactericidal lamp, a xenon lamp, an LED lamp, and the like are preferably used.

The atmosphere at the time of the photo-irradiation is preferably in the air or substituted with an inert gas; and more preferably in an atmosphere substituted with nitrogen to have an oxygen concentration of 1% or less.

(Condition for Semi-curing by Heating)

Preferred conditions for thermal semi-curing in the production method for a compound lens of the invention are described below.

Preferably, the thermal semi-curing is attained so that the semi-cured product after heating could have a complex viscosity of $10^5$ mPa·s to $10^8$ mPa·s at a frequency of 10 Hz and at 25° C., more preferably $10^{5.2}$ mPa·s to $10^{7.5}$ mPa·s, and particularly preferably $10^{5.5}$ mPa·s to $10^{7.5}$ mPa·s.

<Semi-cured Product>

The complex viscosity of the semi-cured product of the curable resin composition at a frequency of 10 Hz at 25° C. is preferably $10^5$ mPa·s to $10^8$ mPa·s, more preferably $10^{5.2}$ mPa·s to $10^{7.5}$ mPa·s, and particularly preferably $10^{5.5}$ mPa·s to $10^{7.5}$ mPa·s.

The semi-cured product of the curable resin composition may not contain the photo-radical polymerization initiator at all after the photo-irradiation process, since the initiator is completely consumed in the process, or the photo-radical polymerization initiator may remain in the semi-cured product.

(Tg)

The glass transition temperature (hereinafter, also referred to as Tg) of the semi-cured product of the curable resin composition is preferably −150° C. to 0° C., more preferably −50° C. to 0° C., and particularly preferably −20° C. to 0° C.

<Thermal Polymerization Process>

The method of manufacturing a compound lens of the present invention includes a thermal polymerization process of putting the semi-cured product of the curable resin composition and the transparent substrate arranged so as to be in contact with the semi-cured product in a molding die for pressure deformation, and heating them for thermal polymerization to obtain a cured product.

The molding die used for the thermal polymerization process of the present invention is also referred to as a thermomolding mold. In general, it is preferable that heating be performed under pressure on the contents by combining two die parts in the thermomolding mold. In the method of manufacturing a cured product of the present invention, it is preferable that a mold be used as the molding die in the thermal polymerization process to obtain the cured product. As such a thermomolding mold, a molding die which is described in, for example, JP-A-2009-126011 can be used.

(Introduction into Molding Die)

In the method of manufacturing a compound lens of the present invention, first, the semi-cured product is put into a molding die. Firstly, the process of putting the semi-cured product into the molding die will be described.

The semi-cured product after photo-irradiation and/or heating is directly placed in a thermomolding mold and is photo-irradiated and/or heated therein, or is placed in a die different from a thermomolding mold and is photo-irradiated and/or heated therein, as described in the section of the process of forming a semi-cured product. In the case where the semi-cured product after photo-irradiation is directly placed in a thermomolding mold and is photo-irradiated and/or heated therein, the operation of putting the semi-cured product into a thermomolding mold is unnecessary, and the semi-cured product is written to be put into a molding die merely for explanation.

On the other hand, in the case where the semi-cured product after photo-irradiation and/or heating is placed in a die different from a thermomolding mold and is photo-irradiated and/or heated therein, the operation means the process of moving the semi-cured product into a thermomolding mold. As the method of moving the semi-cured product after photo-irradiation and/or heating into a thermomolding mold, for example, air tweezers equipped with a syringe, a vacuum pad and a vacuum generator can be used. The semi-cured product of the present invention has a complex viscosity falling within a specific range, and therefore can be readily moved into a thermomolding mold by the use of such air tweezers.

(Pressure Deforming/Heating)

In the thermal polymerization process, the semi-cured product put into a molding die is deformed under pressure and heated for thermal polymerization to obtain a cured product.

Here, pressure deforming and heating may be carried out simultaneously, or heating may be carried out after pressure deforming, or pressure deforming may be carried out after heating. Above all, preferably, pressure deforming and heating are carried out simultaneously. Also preferably, after simultaneous pressure deforming and heating, the product may be further heated at a higher temperature after the pressure applied thereto has become stable.

The pressure for the pressure deforming is preferably 1 kg/cm$^2$ to 100 kg/cm$^2$, more preferably 2 kg/cm$^2$ to 50 kg/cm$^2$, and particularly preferably 2 kg/cm$^2$ to 30 kg/cm$^2$.

The heating temperature is preferably 80° C. to 300° C., more preferably 120° C. to 300° C., and particularly preferably 150° C. to 280° C. when the heating is carried out simultaneously with pressure deforming.

On the other hand, in the case where the product is further heated at a higher temperature after the pressure applied thereto has become stable, the heating temperature is preferably 80° C. to 300° C., more preferably 120° C. to 300° C., and particularly preferably 150° C. to 280° C.

The time of the thermal polymerization is preferably 30 seconds to 1000 seconds, more preferably 30 seconds to 500 seconds, and particularly preferably 60 seconds to 300 seconds.

The atmosphere at the time of the thermal polymerization is preferably air or substituted with an inert gas; and more preferably in an atmosphere substituted with nitrogen to have an oxygen concentration of 1% or less.

<Cured Product>

Hereinafter, preferred characteristics of the cured product are described below.

(Refractive Index)

Preferably, the cured product has a high refractive index from the viewpoint of using it for compound lenses. A refractive index nD at a wavelength of 589 nm of the cured product is preferably 1.45 or more, more preferably 1.50 or more, and particularly preferably 1.51 or more.

(Abbe's Number)

It is preferable that the Abbe's number be large from a viewpoint of reducing the chromatic aberration when used for compound lenses. The cured product preferably has an Abbe's number of 45 or more at a wavelength of 589 nm, more preferably 50 or more, and particularly preferably 55 or more.

In the present specification, an Abbe's number vD is calculated according to the following expression (A) by measuring refractive indices nD, nF and nC at a wavelength of 589 nm, 486 nm and 656 nm, respectively.

[Expression 1]

$$vD = \frac{nD - 1}{nF - nC} \qquad \text{Expression (A)}$$

(Light Transmittance)

Preferably, the light transmittance through a thickness of 1 mm of the cured product at a wavelength of 589 nm is preferably 75% or more, more preferably 80% or more, and particularly preferably 95% or more, from the viewpoint of being used for compound lenses. Further, in the present invention, the light transmittance through a thickness of 1 mm of the cured product is a value obtained by preparing a substrate having a thickness of 1.0 mm, and measuring its light transmittance using a UV-visible adsorption spectrometer (UV-3100, manufactured by Shimadzu Corporation).

(Tg)

Tg of the cured product is preferably 120° C. to 400° C., more preferably 150° C. to 300° C., and particularly preferably 180° C. to 300° C.

(Size)

Preferably, the maximum thickness of the cured product is 0.1 mm to 10 mm. The maximum thickness is more preferably 0.1 mm to 5 mm and particularly preferably 0.15 mm to 4 mm. Also preferably, the maximum diameter of the cured product is 1 mm to 1000 mm. The maximum diameter is more preferably 2 mm to 80 mm and particularly preferably 2.5 mm to 70 mm. The cured product having the size as above is especially useful for compound lenses having a high refractive index. In general, it is not easy to produce such a thick molded article by a solution casting method since the solvent is difficult to remove, or that is, since molding the product is not easy. However, when the method of manufacturing a compound lens of the present invention is used, it is possible to obtain a cured product capable of realizing cured products having high yield and complicated shapes such as non-spherical shapes or the like because the molding is easy and burrs are difficult to generate. In this manner, it is easy to manufacture a cured product having high heat resistance.

[Compound Lens]

In the compound lens of the present invention, the cured product of the curable resin composition containing 5% by mass to 50% by mass of a polymer which has a (meth)acrylate monomer, a non-conjugated vinylidene group-containing compound, and a photo-radical initiator and has at least one polymerizable group selected from a methacryl group, an allyl group, an acryl group, and a vinyl group in the side chain thereof is laminated on at least one side of a transparent substrate (here, the non-conjugated vinylidene group-containing compound is free from a (meth)acrylate monomer).

In addition, the compound lens of the present invention is manufactured by the method of manufacturing a compound lens of the present invention.

<Transparent Substrate>

The transparent substrate is preferably a lens substrate.

In addition, in the present specification, the term "lens substrate" means a single component capable of exhibiting a lens function. Any film and component may be provided on and around the surface of the lens substrate in accordance with the service environment and the use of lenses. For example, a protective film, an antireflection film, a hard coat film, or the like may be formed on the surface of the lens substrate. Further, it is also possible to allow the lens substrate to be intruded and fixed in a substrate holding frame. However, those films and frame are additional components to the lens substrate and therefore differ from the lens substrate itself referred to in the present specification.

On the other hand, the transparent substrate is preferably a glass material.

Examples of the glass material, which are not particularly limited, include a glass lens, flat glass, a glass prism, and a glass mirror.

In addition, the transparent substrate may be a substrate to which the surface treatment is applied using the silane coupling agent as described above, and particularly, a glass material is preferably subjected to the surface treatment using the silane coupling agent.

<Characteristics of Compound Lens>

In the compound lens of the present invention, the light transmittance through a thickness of 1 mm at a wavelength of 589 nm is preferably 75% or more, more preferably 80% or more, and particularly preferably 95% or more.

Further, in the present invention, the light transmittance through a thickness of 1 mm is a value obtained by preparing a substrate having a thickness of 1.0 mm and measuring its light transmittance using a UV-visible adsorption spectrometer (UV-3100, manufactured by Shimadzu Corporation).

<Use of Compound Lens>

Preferably, the compound lens of the present invention is a lens having a high Abbe's number, high refractivity, light transmittance, light weight, and excellent optical characteristics. In addition, the refractive index of the compound lens can be arbitrarily adjusted by appropriately adjusting the kind of monomers constituting the curable resin composition.

The compound lens of the present invention is used for, for example, a lens for a digital camera, a lens for car-mounted camera, a lens for a projector (for an OHP, a liquid crystal projector, or the like), a lens for an endoscope, and a lens for broadcast (for an imaging device such as a TV camera).

Further, the compound lens of the present invention may be used for a lens for eye glasses, a lens for a mobile camera, a lens for optical equipment, an optoelectronics lens, a laser lens, a pickup lens, a microlens array, and a wafer-level lens array (Japanese Patent No, 3926380, Pamphlet of International Publication No. 2008/102648, Japanese Patent No. 4226061, and Japanese Patent No. 4226067).

EXAMPLES

The characteristics of the present invention are described in detail with reference to the following Examples.

In the following Examples, materials, used amounts, ratios, the details of treatments, and the treatment procedures may be suitably modified within the range not departing from the scope of the present invention. Accordingly, the range of the present invention should not be limitatively interpreted by Examples described below.

Example 1

<Obtainment of Non-conjugated Vinylidene Group-containing Compound>

A non-conjugated vinylidene group-containing compound B-1 and β-Caryophyllene (trade name, manufactured by Tokyo Chemical Industry) were used.

<Preparation of Curable Resin Composition>

60 parts by mass of the above-described polyfunctional (meth)acrylic monomer (Aa-1) (A-DCP (trade name), manufactured by Shin-Nakamura Chemical Industry), 10 parts by mass of the above-described non-conjugated vinylidene group-containing compound B-1 (β-Caryophyllene (trade name), manufactured by Tokyo Chemical Industry), 0.1 parts by mass of the following photo-radical polymerization initiator C (Irgacure 184, manufactured by BASF Corporation), 1 part by mass of the following thermal radical polymerization initiator D-1 (Perbutyl O, manufactured by NOF Corporation), and 0.5 parts by mass of the following thermal radical polymerization initiator D-2 (Percumyl H, manufactured by NOF Corporation) were mixed to prepare a curable resin composition.

Structures of the used polymerization initiators are shown below.

Photo-Radical Polymerization Initiator C

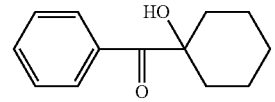 [SMILES: O=C(c1ccccc1)C1(O)CCCCC1]

Thermal Radical Polymerization Initiator

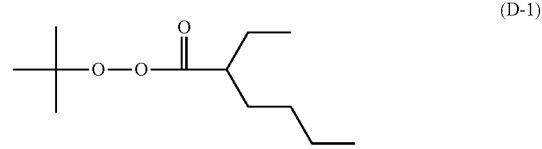

(D-1)

(D-2)

(Synthesis of Polymer E-3)

20.0 g of tricyclo[5,2,1,0$^{2,6}$]dec-8-yl acrylate (FA-513AS (trade name), manufactured by Hitachi Chemical Co., Ltd.), 30.0 g of allyl methacrylate (manufactured by Wako Pure Chemical Industries, Ltd.), and 450.0 g of ethyl acetate were added to a 1 L three-necked flask with a reflux condenser and a gas inlet cock, nitrogen substitution was carried out twice, 7.5 g of V-65 (trade name, manufactured by Wako Pure Chemical Industries, Ltd.) was added thereto as an initiator, nitrogen substitution was further carried out twice, and the resultant was heated at 65° C. for 4 hours in a nitrogen gas stream. Subsequently, the reacted solution was poured to 2 L of methanol, and the deposited white solid was collected by suction filtration. Next, the resultant was dried under reduced pressure at 70° C. for 5 hours, and a solvent was distilled, thereby obtaining a polymer E-3 (yield: 60%, weight average molecular weight: 100000).

With the above-described process, the polymer E-3 having an allyl group as a polymerizable group in the side chain thereof was obtained (weight average molecular weight: 100000).

<Characteristics of Curable Resin Composition>

(Viscosity of Curable Resin Composition at 10 Hz and at 25° C.)

In regard to the curable resin composition prepared in the above-described manner, the value of the dynamic complex viscosity at 10 Hz and at 25° C. was measured to be set as the liquid viscosity of the curable resin composition using Rheostress RS600 (manufactured by HAAKE, Inc.).

<Characteristics of Semi-cured Product>

(Viscosity at 10 Hz and at 25° C. After UV Irradiation)

The curable resin composition injected into a die having a diameter of 20 mm and a thickness of 1 mm was irradiated with UV rays at 15 mW/cm$^2$ for the period of time shown in the following Table 1, using Execure 3000 (by HOYA Corporation), thereby obtaining a semi-cured product (photo-cured product). Next, the value of the dynamic complex viscosity at 10 Hz and at 25° C. was measured to be set as the viscosity of the semi-cured product using Rheostress RS600 (manufactured by HAAKE, Inc.).

<Manufacture of Compound Lens>

A glass material BK-7 of a transparent glass lens having a refractive index of 1.509 covered the entire surface of 200 mg of the curable resin composition which was manufactured by the above-described method and injected into a metal molding die (the surface in contact with the curable resin composition is a curved surface for forming a lens), on the side not in contact with a metal molding die of the curable resin composition, and the metal molding die was filled with the curable resin composition such that the surface of the entire curable resin composition was brought into contact with the metal molding die or a glass lens (so as for bubbles not to be mixed). Subsequently, the glass lens was irradiated with UV rays at 15 mW/cm$^2$ from the upside thereof for the period of time listed in the following Table 1 using Execure 3000 (manufactured by HOYA Corporation), thereby preparing a semi-cured product whose viscosity was adjusted to be the same viscosity when measured as a viscosity characteristic of the semi-cured product described above. Next, the temperature was raised to 200° C. while 2 kgf/cm$^2$ of pressure was applied to the semi-cured product in a state in which the semi-cured product was interposed between the metal molding die and the glass lens, and the temperature was cooled to room temperature. Subsequently, the compound lens on which the cured product (height: 200 μm) of the curable resin composition and the glass lens were laminated was extracted from the metal molding die.

The above-described process was repeatedly carried out for ten times for evaluation described below, and the obtained ten compound lenses were set as the compound lenses in Example 1.

<Evaluation of Compound Lens>

(Transfer Property)

The appearance of each prepared compound lens was evaluated using Form Talysurf S5C (manufactured by Taylor-Hobson, Inc.) and Digital Microscope (trade name: VHX-1000, manufactured by KEYENCE Corporation).

Those with fine unevenness (wrinkles) on the surface of the flange part of each lens, and those with cracks generated on lenses were considered as defective products, and those with neither wrinkles nor cracks were considered as non-defective products. Ten compound lenses were evaluated, and of those, the rate of non-defective products was referred to as a yield, and the evaluation was performed according to the following criteria.
A: The yield was 80% or more.
B: The yield was 50% or more.
C: The yield was 30% or more
D: The yield was less than 30%.

(Heat Resistance)

Each of the prepared compound lenses was heated at 85° C., and the appearance of the shapes of compound lenses after 100 hours passed was evaluated using Form Talysurf S5C (Talysurf, manufactured by Taylor-Hobson, Inc.) and Digital Microscope (trade name: VHX-1000, manufactured by KEYENCE Corporation). Those with cracks, and those which were confirmed that the shapes thereof were changed were considered as defective products, and those with neither cracks nor a change in shape were considered as non-defective products. Ten compound lenses were evaluated, and of those, the rate of non-defective products was referred to as a yield, and the evaluation was performed according to the following criteria.
A: The yield was 80% or more.
B: The yield was 50% or more.
C: The yield was 30% or more
D: The yield was less than 30%.

(Number of Bubble Mixtures)

The number of bubbles generated in a laminate of the curable resin composition and the glass lens when the glass lens is covered on the curable resin composition which was put into a cylindrical mold was evaluated using Digital Microscope (trade name: VHX-1000, manufactured by KEYENCE Corporation). The numbers of bubble mixtures at the time of preparation of ten compound lenses were respectively measured and the evaluation was performed according to the following criteria.
A: The number of bubble mixtures per one compound lens was 0.
B: The number of bubble mixtures per one compound lens was 1 to 3.
C: The number of bubble mixtures per one compound lens was 4 to 9.
D: The number of bubble mixtures per one compound lens was 10 or more.

(Crack Resistance)

Prepared each compound lens was heated at 85° C. and at a relative humidity of 85%, and the appearance of the shapes of compound lenses after 100 hours passed was evaluated using Form Talysurf S5C (Talysurf, manufactured by Taylor-Hobson, Inc.) and Digital Microscope (trade name: VHX-1000, manufactured by KEYENCE Corporation). Those with cracks, and those which were confirmed that the shapes thereof were changed were considered as defective products, and those with neither cracks nor a change in shape were considered as non-defective products. Ten compound lenses were evaluated, and of those, the rate of non-defective products was referred to as a yield, and the evaluation was performed according to the following criteria.
A: The yield was 80% or more.
B: The yield was 50% or more.
C: The yield was 30% or more
D: The yield was less than 30%.

Examples 2 to 13, Comparative Examples 1 to 4

Curable resin compositions were prepared for which the materials used were changed as in the following Table 1, and compound lenses of Examples and Comparative Examples were manufactured and evaluated. The obtained results are listed in the following Table 1.

Further, materials used in Examples and Comparative Examples are described below.

Epoxy Monomer (Bisphenol a Diglycidylether, Manufactured by Tokyo Chemical Industry Co., Ltd.)

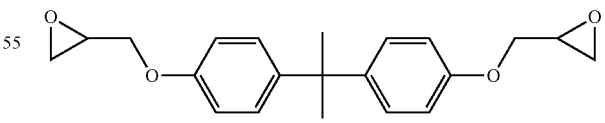

<Obtainment of Polymer Having Non-conjugated Vinyl Group in Side Chain Thereof>

Polymers E-1, E-2, E-4, and E-5 having the non-conjugated vinyl group used in Examples 8 to 11 were synthesized and obtained by the methods described below.

(Synthesis of E-1)

20.0 g of tricyclo[5,2,1,0$^{2,6}$]dec-8-yl acrylate (FA-513AS (trade name), manufactured by Hitachi Chemical Co., Ltd.), 30.0 g of allyl methacrylate (manufactured by Wako Pure Chemical Industries, Ltd.), and 450.0 g of ethyl acetate were added to a 1 L three-necked flask with a reflux condenser and a gas inlet cock, nitrogen substitution was carried out twice, 7.5 g of V-65 (trade name, manufactured by Wako Pure Chemical Industries, Ltd.) was added thereto as an initiator, nitrogen substitution was further carried out twice, and the resultant was heated at 65° C. for 30 minutes in a nitrogen gas stream. Subsequently, the reacted solution was poured to 2 L of methanol, and the deposited white solid was collected by suction filtration. Next, the resultant was dried under reduced pressure at 70° C. for 5 hours, and a solvent was distilled, thereby obtaining a polymer E-1 (yield: 60%, weight average molecular weight: 1500).

With the above-described process, the polymer E-1 having an allyl group as a polymerizable group in the side chain thereof was obtained (weight average molecular weight: 1500).

(Synthesis of E-2)

20.0 g of tricyclo[5,2,1,0$^{2,6}$]dec-8-yl acrylate (FA-513AS (trade name), manufactured by Hitachi Chemical Co., Ltd.), 30.0 g of allyl methacrylate (manufactured by Wako Pure Chemical Industries, Ltd.), and 450.0 g of ethyl acetate were added to a 1 L three-necked flask with a reflux condenser and a gas inlet cock, nitrogen substitution was carried out twice, 7.5 g of V-65 (trade name, manufactured by Wako Pure Chemical Industries, Ltd.) was added thereto as an initiator, nitrogen substitution was further carried out twice, and the resultant was heated at 65° C. for 1 hour in a nitrogen gas stream. Subsequently, the reacted solution was poured to 2 L of methanol, and the deposited white solid was collected by suction filtration. Next, the resultant was dried under reduced pressure at 70° C. for 5 hours, and a solvent was distilled, thereby obtaining a polymer E-2 (yield: 62%, weight average molecular weight: 2100).

With the above-described process, the polymer E-2 having an allyl group as a polymerizable group in the side chain thereof was obtained (weight average molecular weight: 2100).

(Synthesis of E-4)

20.0 g of tricyclo[5,2,1,0$^{2,6}$]dec-8-yl acrylate (FA-513AS (trade name), manufactured by Hitachi Chemical Co., Ltd.), 30.0 g of allyl methacrylate (manufactured by Wako Pure Chemical Industries, Ltd.), and 450.0 g of ethyl acetate were added to a 1 L three-necked flask with a reflux condenser and a gas inlet cock, nitrogen substitution was carried out twice, 7.5 g of V-65 (trade name, manufactured by Wako Pure Chemical Industries, Ltd.) was added thereto as an initiator, nitrogen substitution was further carried out twice, and the resultant was heated at 65° C. for 6 hours in a nitrogen gas stream. Subsequently, the reacted solution was poured to 2 L of methanol, and the deposited white solid was collected by suction filtration. Next, the resultant was dried under reduced pressure at 70° C. for 5 hours, and a solvent was distilled, thereby obtaining a polymer E-4 (yield: 70%, weight average molecular weight: 180000).

With the above-described process, the polymer E-4 having an allyl group as a polymerizable group in the side chain thereof was obtained (weight average molecular weight: 180000).

(Synthesis of E-5)

20.0 g of tricyclo[5,2,1,0$^{2,6}$]dec-8-yl acrylate (FA-513AS (trade name), manufactured by Hitachi Chemical Co., Ltd.), 30.0 g of allyl methacrylate (manufactured by Wako Pure Chemical Industries, Ltd.), and 450.0 g of ethyl acetate were added to a 1 L three-necked flask with a reflux condenser and a gas inlet cock, nitrogen substitution was carried out twice, 7.5 g of V-65 (trade name, manufactured by Wako Pure Chemical Industries, Ltd.) was added thereto as an initiator, nitrogen substitution was further carried out twice, and the resultant was heated at 65° C. for 8 hours in a nitrogen gas stream. Subsequently, the reacted solution was poured to 2 L of methanol, and the deposited white solid was collected by suction filtration. Next, the resultant was dried under reduced pressure at 70° C. for 5 hours, and a solvent was distilled, thereby obtaining a polymer E-5 (yield: 55%, weight average molecular weight: 220000).

With the above-described process, the polymer E-5 having an allyl group as a polymerizable group in the side chain thereof was obtained (weight average molecular weight: 220000).

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| (meth)acrylate monomer Aa-1 [parts by mass] | | 63.4 | 63.4 | 93.4 | 78.4 | 53.4 | 33.4 | 83.4 | 53.4 | 63.4 |
| Non-conjugated vinylidene group-containing compound B-1 [parts by mass] | | 5.0 | 5.0 | 5.0 | 5.0 | 5.0 | 5.0 | 5.0 | 5.0 | 5.0 |
| Photo-radical initiator [parts by mass] | C | 0.1 | 1.6 | 0.1 | 0.1 | 0.1 | 0.1 | 0.1 | 0.1 | 0.1 |
| Thermal radical initiator [parts by mass] | D-1 | 1.0 | | 1.0 | 1.0 | 1.0 | 1.0 | 1.0 | 1.0 | 1.0 |
| | D-2 | 0.5 | | | 0.5 | 0.5 | 0.5 | 0.5 | 0.5 | 0.5 |
| Polymer having at least one polymerizable group selected from methacryl group, allyl group, acryl group, and vinyl group in side chain thereof | E-1 | | | | | | | | | 30 |
| | E-2 | | | | | | | | | |
| | E-3 | 30 | 30 | 0 | 15 | 40 | 60 | 10 | | |
| | E-4 | | | | | | | | 40 | |
| | E-5 | | | | | | | | | |
| Epoxy monomer | F | | | | | | | | | |
| Condition of photo-polymerization | Irradiation time (seconds) | 20 | 20 | 20 | 20 | 20 | 20 | 20 | 20 | 20 |

TABLE 1-continued

| Characteristic of resin composition before curing | Liquid viscosity at 10 Hz and at 25° C. [mPa · s] | 8,000 | 8,000 | 800 | 4,000 | 10,000 | 18,000 | 1,200 | 25,000 | 1,200 |
|---|---|---|---|---|---|---|---|---|---|---|
| Characteristic of semi-cured product | Viscosity at 10 Hz and at 25° C. after UV irradiation [mPa · s] | $1.5 \times 10^6$ | $1.5 \times 10^6$ | $1.2 \times 10^5$ | $5.4 \times 10^5$ | $4.2 \times 10^6$ | $8.0 \times 10^8$ | $1.4 \times 10^5$ | $9.1 \times 10^6$ | $6.3 \times 10^5$ |
| Characteristic of lens | Transfer property | A | C | B | B | B | C | C | C | C |
| | Number of bubble mixtures | A | A | C | B | B | B | C | B | C |
| | Heat resistance | A | A | A | A | A | A | A | A | A |
| | Crack resistance | A | A | B | A | A | A | B | A | B |

| | | Example 10 | Example 11 | Example 12 | Example 13 | Comparative Example 1 | Comparative Example 2 | Comparative Example 3 | Comparative Example 4 |
|---|---|---|---|---|---|---|---|---|---|
| (meth)acrylate monomer Aa-1 [parts by mass] | | 63.4 | 63.4 | 63.4 | 63.4 | | | 98.4 | 93.5 |
| Non-conjugated vinylidene group-containing compound B-1 [parts by mass] | | 5.0 | 5.0 | 5.0 | 5.0 | | 5.0 | | 5.0 |
| Photo-radical initiator [parts by mass] | C | 0.1 | 0.1 | 0.1 | 0.1 | 0.1 | 0.1 | 0.1 | |
| Thermal radical initiator [parts by mass] | D-1 | 1.0 | 1.0 | 1.0 | 1.0 | 1.0 | 1.0 | 1.0 | 1.0 |
| | D-2 | 0.5 | 0.5 | 0.5 | 0.5 | 0.5 | 0.5 | 0.5 | 0.5 |
| Polymer having at least one polymerizable group selected from methacryl group, allyl group, acryl group, and vinyl group in side chain thereof | E-1 | | | | | | | | |
| | E-2 | 30 | | | | | | | |
| | E-3 | | | 30 | 30 | | 93.4 | | |
| | E-4 | | | | | | | | |
| | E-5 | | 30 | | | | | | |
| Epoxy monomer | F | | | | | 98.4 | | | |
| Condition of photo-polymerization | Irradiation time (seconds) | 20 | 20 | 40 | 15 | 20 | 20 | 20 | 20 |
| Characteristic of resin composition before curing | Liquid viscosity at 10 Hz and at 25° C. [mPa · s] | 5,500 | 18,000 | 8,000 | 8,000 | <500 | — | 850 | 800 |
| Characteristic of semi-cured product | Viscosity at 10 Hz and at 25° C. after UV irradiation [mPa · s] | $1.0 \times 10^6$ | $1.8 \times 10^6$ | $>10^8$ | $9.6 \times 10^4$ | $>10^8$ | — | $>10^8$ | $<10^5$ |
| Characteristic of lens | Transfer property | B | C | C | C | D | — | D | D |
| | Number of bubble mixtures | B | B | A | A | D | — | B | D |
| | Heat resistance | A | A | A | A | D | — | D | B |
| | Crack resistance | B | A | A | A | C | — | B | B |

From Table 1 above, it was understood that the compound lens obtained by the manufacturing method of the present invention has an excellent transfer property, small number of bubble mixtures, and excellent heat resistance and crack resistance.

In contrasts, from Comparative Example 1, it was understood that in a case where the non-conjugated vinylidene group-containing compound was not added to the curable resin composition using an epoxy monomer instead of the (meth)acrylate monomer, the transfer property, the number of bubble mixtures, and the heat resistance of the obtained compound lens were poor.

From Comparative Example 2, it was understood that in a case where the polymer having at least one polymerizable group selected from a methacryl group, an allyl group, an acryl group, and a vinyl group in the side chain thereof was used as a main binder of the resin composition without using the (meth)acrylate monomer, semi-curing and curing by UV rays and heating could not be carried out so that the compound lens could not be manufactured.

From Comparative Example 3, it was understood that in a case where the non-conjugated vinylidene group-containing compound was not added to the curable resin composition, the transfer property and the heat resistance were poor.

From Comparative Example 4, it was understood that in a case where the photo-polymerization initiator was not added to the curable resin composition, the transfer property of the obtained compound lens was poor and the number of bubble mixtures thereof was large.

(Light Transmittance)

The light transmittance was measured on compound lenses of respective Examples using the method described in the present specification. As a result, all compound lenses had 95% or more of light transmittance.

Further, it was understood that the compound lenses of respective Examples had the following characteristics and excellent optical characteristics as a compound lens.

Refractive index: 1.52, Abbe's number: 52, Tg (glass transition temperature): 200° C.

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2013/057388, filed Mar. 15, 2013, and Japanese Application No. 2012-078045, filed Mar. 29, 2012, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method of manufacturing a compound lens, comprising heating and pressing a semi-cured product of a curable resin composition containing a (meth)acrylate monomer, a non-conjugated vinylidene group-containing compound, and a photo-radical initiator and a transparent substrate arranged so as to be in contact with the semi-cured product in a state in which a molding die is filled with the semi-cured product and the transparent substrate, and obtaining a cured product by allowing the semi-cured product to be thermally polymerized, provided that the non-conjugated vinylidene group-containing compound is free from a (meth)acrylate monomer, wherein the non-conjugated vinylidene group-containing compound is represented by the following general formula (1):

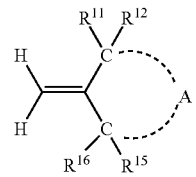

General Formula (1)

wherein $R^{11}$, $R^{12}$, $R^{15}$, and $R^{16}$ each independently represents a substituent and A represents an atomic group necessary for forming an alicyclic ring.

2. The method of manufacturing a compound lens according to claim 1, wherein the transparent substrate is a glass material.

3. The method of manufacturing a compound lens according to claim 1, wherein the transparent substrate is a glass lens.

4. The method of manufacturing a compound lens according to claim 1, wherein the semi-cured product of the curable resin composition has a complex viscosity of $10^5$ mPa·s to $10^8$ mPa·s at a frequency of 10 Hz at 25° C.

5. The method of manufacturing a compound lens according to claim 1, further comprising filling the molding die with the curable resin composition in a state of being in contact with the transparent substrate.

6. The method of manufacturing a compound lens according to claim 5, wherein the process of filling the molding die with the curable resin composition in a state of being in contact with the transparent substrate is a process of filling the molding die with the curable resin composition and laminating the transparent substrate on a surface of the curable resin composition on a side which is not in contact with the molding die.

7. The method of manufacturing a compound lens according to claim 1, wherein the molding die is filled with the semi-cured product of the curable resin composition and the transparent substrate is laminated on the surface of the semi-cured product of the curable resin composition on the side which is not in contact with the molding die.

8. The method of manufacturing a compound lens according to claim 1, further comprising subjecting the curable resin composition to at least one of photo-irradiation and heating to form a semi-cured product of the curable resin composition.

9. The method of manufacturing a compound lens according to claim 1, further comprising subjecting the curable resin composition to photo-irradiation to form a semi-cured product of the curable resin composition.

10. The method of manufacturing a compound lens according to claim 1, wherein the curable resin composition contains a thermal radical initiator.

11. The method of manufacturing a compound lens according to claim 1, wherein the curable resin composition contains 5% by mass to 50% by mass of a polymer having at least one polymerizable group selected from a methacryl group, an allyl group, an acryl group, and a vinyl group in a side chain thereof.

12. The method of manufacturing a compound lens according to claim 1, wherein the polymer having at least one polymerizable group selected from a methacryl group, an allyl group, an acryl group, and a vinyl group at the side chain thereof has a weight average molecular weight of 2000 to 200000.

13. The method of manufacturing a compound lens according to claim 1, wherein the curable resin composition before semi-curing has a liquid viscosity of 1000 mPa·s to 20000 mPa·s at a frequency of 10 Hz at 25° C.

14. The method of manufacturing a compound lens according to claim 1, wherein the molding die is a metal molding die.

15. A compound lens, wherein a cured product of a curable resin composition containing 5% by mass to 50% by mass of a polymer which has a (meth)acrylate monomer, a non-conjugated vinylidene group containing compound, and a photo-radical initiator and has at least one polymerizable group selected from a methacryl group, an allyl group, an acryl group, and a vinyl group in a side chain thereof is laminated on at least one side of a transparent substrate, provided that the non-conjugated vinylidene group-containing compound is free from a (meth)acrylate monomer, wherein the non-conjugated vinylidene group-containing compound is a compound represented by the following general formula (1):

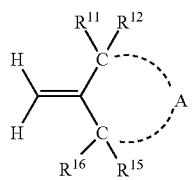

General Formula (1)

wherein $R^{11}$, $R^{12}$, $R^{15}$, and $R^{16}$ each independently represents a substituent and A represents an atomic group necessary for forming an alicyclic ring.

16. The compound lens according to claim 15, wherein the transparent substrate is a glass material.

17. The compound lens according to claim 15, wherein the transparent substrate is a glass lens.

18. A compound lens which is manufactured by heating and pressing a semi-cured product of a curable resin composition containing a (meth)acrylate monomer, a non-conjugated vinylidene group-containing compound, and a photo-radical initiator and a transparent substrate arranged so as to be in contact with the semi-cured product in a state in which a molding die is filled with the semi-cured product and the transparent substrate, and obtaining a cured product by allowing the semi-cured product to be thermally polymerized, provided that the non-conjugated vinylidene group-containing compound is free from a (meth)acrylate monomer, wherein the non-conjugated vinylidene group-containing compound is a compound represented by the following general formula (1):

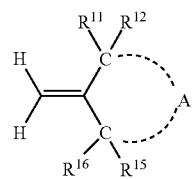

General Formula (1)

wherein $R^{11}$, $R^{12}$, $R^{15}$, and $R^{16}$ each independently represents a substituent and A represents an atomic group necessary for forming an alicyclic ring.

* * * * *